May 9, 1933.  J. M. REDINGER  1,908,628
MILLING CUTTER
Filed Jan. 29, 1932
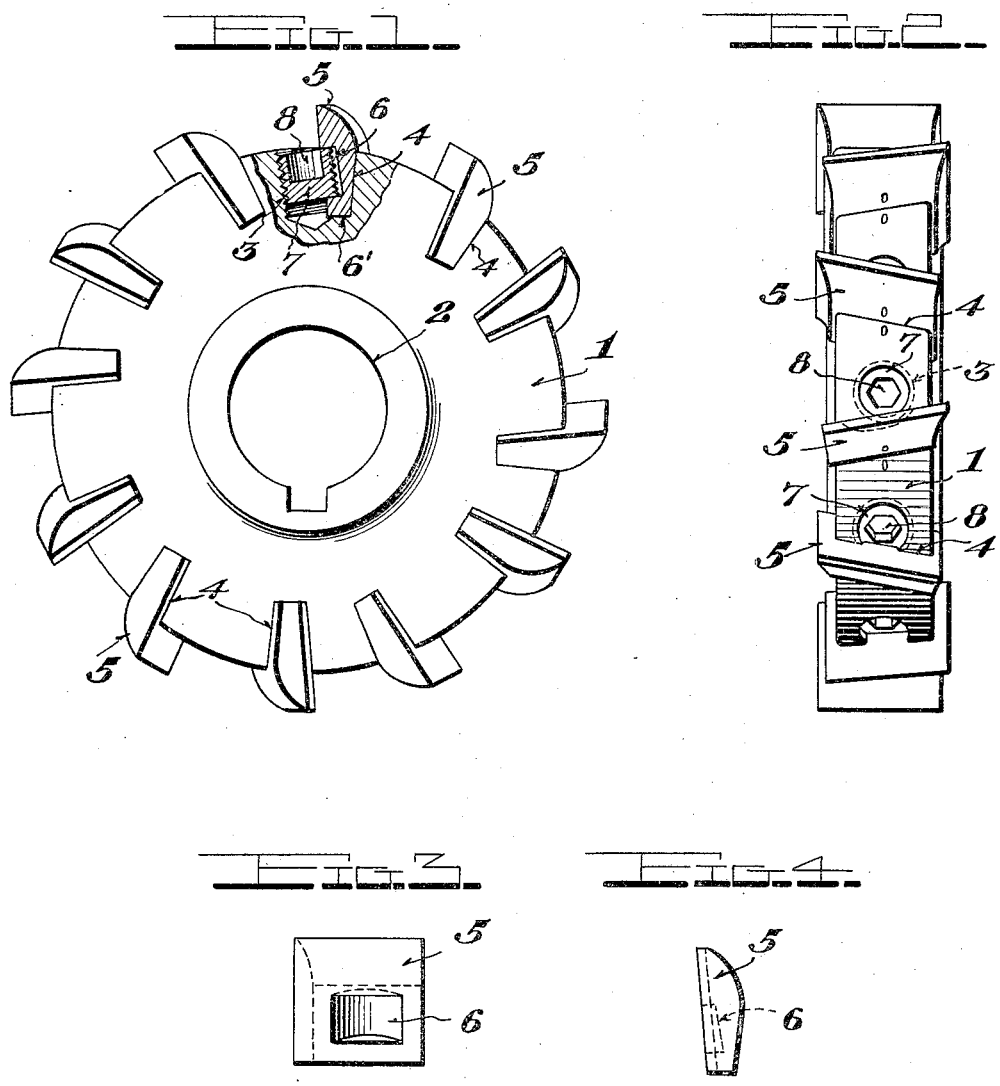

Patented May 9, 1933

1,908,628

UNITED STATES PATENT OFFICE

JOSEPH M. REDINGER, OF JOHNSTON, RHODE ISLAND

MILLING CUTTER

Application filed January 29, 1932. Serial No. 589,575.

This invention relates to certain new and useful improvements in milling cutters and more particularly to cutters of this type which have removable cutting teeth, the primary object of the invention being to provide means which not only effectively secures the tooth in position, but which can be easily and quickly operated in applying and removing the teeth.

A further object of the invention is to provide means of this type which is of a simple and economical construction and which involves but a single element.

The invention has further and other objects which will be later set forth and manifested in the course of the following description.

In the drawing:

Figure 1 is a side elevation of the invention, parts being broken away and shown in section;

Figure 2 is a top plan view;

Figure 3 is a rear side elevation of one of the cutting teeth; and

Figure 4 is an end view of Figure 3.

In proceeding in accordance with the present invention a body 1 of disk-like form is provided which has a hub 2 formed with an opening to receive the shaft or spindle not shown on which the cutter is mounted. The periphery of the body 1 is formed with a series of circular threaded openings 3 which are bisected by transversely extending cut-out portions 4 which latter receive therein the cutting teeth 5, the lower ends of the teeth seating on the bottoms 6' of the cut-outs. As shown more particularly in Figure 4 the teeth 5 are of wedge shape at their lower portions and their rear side faces are formed with apertured portions 6 which latter are complementary to the openings 3 so that the cut-out portions and the openings conjointly form bores of circular shape. The openings 3 receive screw threaded plugs 7 therein which latter at their outer ends are formed with wrench receiving holes 8.

In operation, the screw plug 7 is placed in the apertured portion or cavity 6 of the tooth whereupon the parts are then positioned with respect to the body and with the plug in register with the opening 3, following which the plug is screwed into the opening and due to the bottom of the plug bearing against the bottom wall of the cavity 6 of the tooth, as the plug is screwed downwardly the tooth if moved into its seat 4 and by virtue of its wedge shape is effectively secured in position, it being understood that the plug is screwed downwardly until the bottom of the tooth seats firmly against the bottom 6' of the cut-out 4. In this manner the tooth is wedged into position and is firmly and effectively held. To remove the tooth the plug 7 is moved in a counter direction and by virtue of its upper end engaging the top wall of the cavity 6, it will be seen that the tooth will be moved out of the cut-out 4, so that the tooth can then be ground or otherwise refinished prior to resecurement as above described.

Having thus described my invention what I claim as new and desire to secure by Letters Patent is:—

1. In a cutter, a body having threaded circular bores and cut-outs intersecting the bores, said cut-outs each having a bottom wall, and a tapered wall opposite the point which intersects the circular bores, teeth fitted in the cut-outs and each having a tapered part engaging said tapered walls of the bores and further having cavities which communicate with the bores and which cavities provide spaced inner and outer shoulders, and plugs of substantially uniform diameter throughout threaded in the bores and extending into the cavities, said plugs having their inner and outer ends abutting the inner and outer shoulders of the cavities respectively so as to effect movement of the teeth relative to the body in accordance with the direction of rotation of the plugs, and upon movement of the plugs inwardly of the bores to cause the inner ends of the teeth to abut the bottom walls of the cut-outs.

2. In a cutter, a body having threaded circular bores and which are provided with bottom walls and cut-outs which intersect the bores, teeth fitted in the cut-outs and having cavities which communicate with the bores and which provide spaced inner and outer shoulders, and plugs of substantially uniform diameter throughout threaded in the bores and extending into the cavities, said plugs having their inner and outer ends abutting the inner and outer shoulders of the cavities so as to effect movement of the teeth relative to the body in accordance with the direction of rotation of the plugs and upon movement of the plugs inwardly of the bores to cause the inner ends of the teeth to abut the bottom walls of the cut-outs.

In testimony whereof I have signed my name to this specification.

JOSEPH M. REDINGER.